April 19, 1955 R. K. LADISCH 2,706,710
PORTABLE POLAROGRAPHIC HALF CELL
Filed Aug. 4, 1953 2 Sheets-Sheet 1
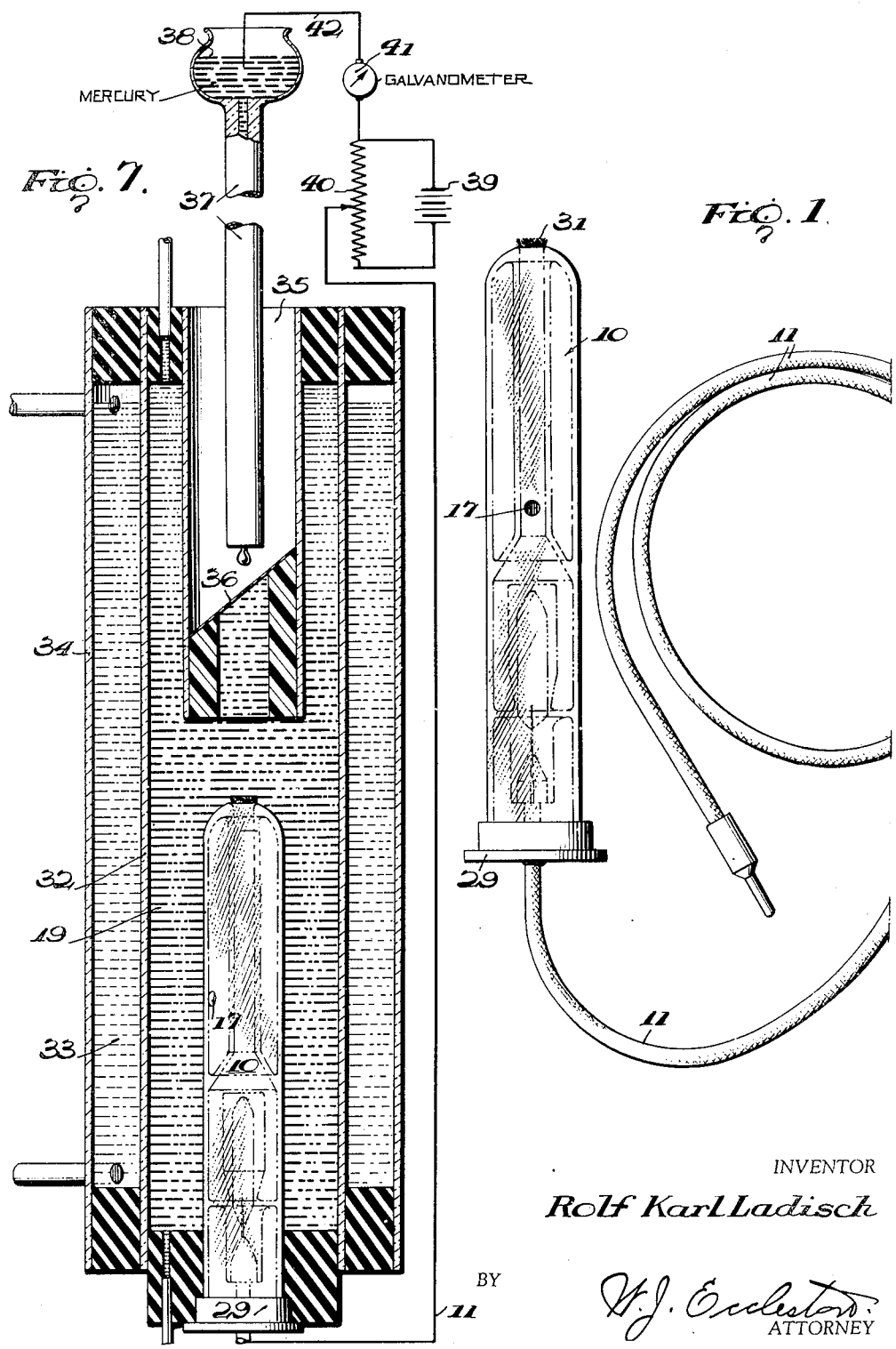
INVENTOR
Rolf Karl Ladisch
BY
W. J. Eccleston
ATTORNEY April 19, 1955 — R. K. LADISCH — 2,706,710
PORTABLE POLAROGRAPHIC HALF CELL
Filed Aug. 4, 1953 — 2 Sheets-Sheet 2
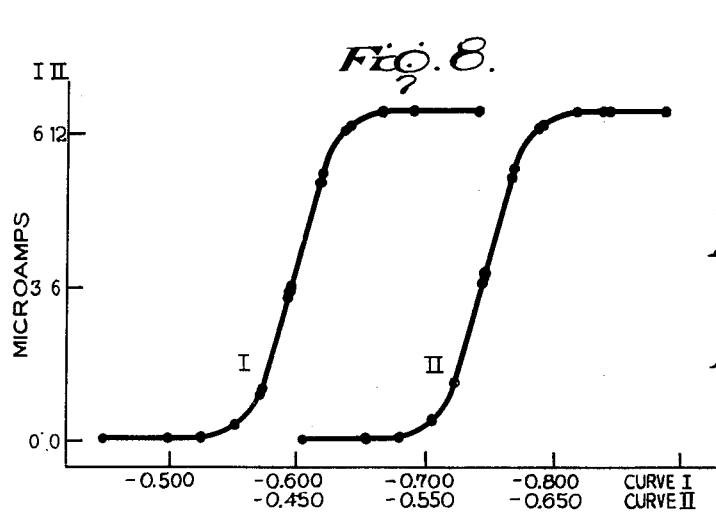
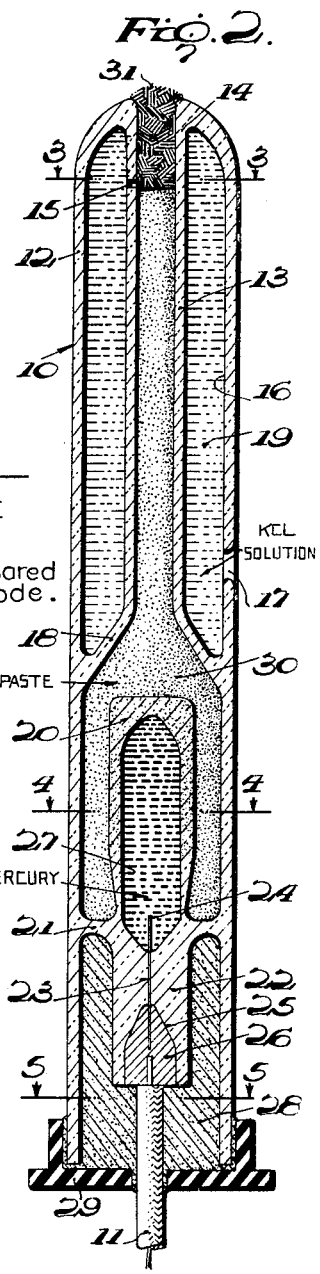
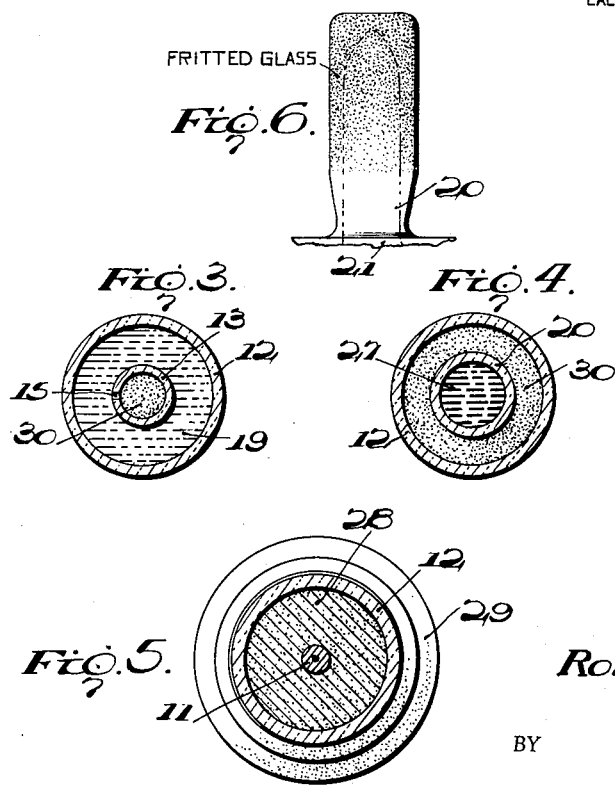
INVENTOR
Rolf Karl Ladisch
BY
ATTORNEY

United States Patent Office 2,706,710
Patented Apr. 19, 1955

2,706,710
PORTABLE POLAROGRAPHIC HALF CELL

Rolf Karl Ladisch, Lansdowne, Pa., assignor to the United States of America as represented by the Secretary of the Army Application August 4, 1953, Serial No. 372,411

4 Claims. (Cl. 204—195)

(Granted under Title 35, U. S. Code (1952), sec. 266)

The invention described herein, if patented, may be manufactured and used by or for the Government for governmental purposes without the payment to me of any royalty thereon.

The present invention relates to portable polarographic half cells such are are used in qualitative and quantitative analyses of certain solutions, and to a method of making such cells.

In using a polarograph for studying diffusion currents, a calomel half cell is most commonly employed as a reference electrode in series with the dropping mercury electrode. Half cells in wide use, such as those described by J. J. Lingane and H. A. Laitinen in Ind. Eng. Chem., Anal. Ed., Vol. 11, p. 504 (1939) and G. S. Smith in The Analyst, Vol. 75, p. 215 (1950), cannot be moved about freely because shaking them sometimes causes inaccuracies of 1–3 millivolts or even more, and full accuracy may not be restored until five or six hours have elapsed. Besides, these prior art structures must be kept in an upright position to maintain the original cleanliness of the platinum contact.

This invention aims to provide a non-polarizable, rugged half cell of low ohmic resistance, especially made to confine the mercury in a rigid support, so that the electrical contact between the platinum wire and the mercury is not disturbed under the conditions of polarographic procedure. A specific object is to employ glass frit to confine the mercury, which makes possible the improved method of making half cells which is hereinafter described and claimed.

In the accompanying drawings forming a part of this specification,

Fig. 1 is a full size elevation of the half cell, showing a conventional lead for the platinum wire;

Fig. 2 is an enlarged longitudinal section omitting the lead;

Fig. 3 is a cross section on line 3—3 of Fig. 2 omitting the plug of glass wool;

Figs. 4 and 5 are respectively cross sections on lines 4—4 and 5—5 of Fig. 2;

Fig. 6 is a detail in elevation;

Fig. 7 is a diagrammatic view partly in elevation showing a polarographic set-up including the half cell; and Fig. 8 is a reproduction of two curves made from actual tests with the half cell and with a conventional pool electrode.

Referring particularly to the drawings, Fig. 1 shows the completed half cell 10 with a lead 11 coupled thereto. The preferred construction (Fig. 2) comprises a generally tubular glass body 12 enclosing a tubular glass chamber 13 located in the upper half of body 12, said tubular chamber 13 having its upper open end fused as at 14 to be integral with the tubular glass body 12, which is thus sealed at its upper end. A small aperture 15 is provided in the upper part of the wall of tubular chamber 13. Preferably the outside diameter of tubular chamber 13 is approximately half that of the outside diameter of body 12, and tubular member 13 is co-axial with body 12 so that an annular chamber 16 is provided between the outer walls of chamber 13 and the inner walls of body 12. This annular chamber 16, however, has a port 17 which is larger than aperture 15 and is located near the bottom of said chamber. The bottom walls 18 of chamber 16 are provided by fusing the lower end of tubular chamber 13 to the walls of body 12. The parts so far described provide an annular chamber 16 with an outer opening 17, and a tubular body 13 open at both ends and having its sole communication with chamber 16 which is designed to contain KCl solution, shown at 19.

Located below the bottom walls 18 and spaced therefrom is a small tubular mercury reservoir or chamber 20, also of glass, said reservoir having a closed upper end and closed sides and being fused at its lower end to a transverse glass partition 21, said partition being fused to the walls of the glass body 12. The upper part of the mercury reservoir is of fritted glass. Just below the partition 21 a platinum wire 24 is fused into glass 22, as at 23, the glass body having a recess 25 for soft solder 26 which makes electrical and mechanical connection between platinum wire 24 and lead wire 11. In lieu of a platinum wire, an ordinary tungsten-copper lead may be employed. The upper end of platinum wire 24 extends into and makes electrical contact with mercury 27 in reservoir 20. A mass of insulating cement 28 of any preferred composition closes the bottom of body 12 and holds the solder 26 and the end of lead 11 in place. Finally, a flanged rubber cap 29 is placed over the lower end of tubular body 12 and is secured thereto by cement 28, the lead 11 passing through a central aperture in the rubber cap. Calomel paste 30 fills all the space above partition 21 inside body 12 and chamber 13 up almost as far as aperture 15. At aperture 15, a wad or plug 31 of glass wool or other insert fibrous material is inserted in the open end of chamber 13 to hold the calomel paste 30 against displacement. The calomel paste, the mercury, and the KCl solution adhere to the standards of polarographic research, which are known to those skilled in the art and are fully described in the literature available to research workers.

Referring to Fig. 7, the described half cell has its upper part immersed in a sealed tube or cylinder 32 containing KCl solution 19, with a water jacket 33 formed by circulating water through a vessel 34 surrounding said tube or cylinder, so that the temperature of the half cell will remain substantially constant during an analysis. Also located in the sealed tube or cylinder 32 above the half cell is an open vessel 35 closed at the lower end by a very thin resin membrane 36 whose under surface is in direct contact with the KCl solution 19 in said tube or cylinder. My pending application Ser. No. 220,325 filed April 10, 1951 discloses vessel 35 in more detail. The open vessel 35 contains the solution to be tested (not shown) and a dropping mercury electrode 37 drops mercury 38 into said vessel in the well-known manner. A battery 39 with a rheostat 40, a galvanometer 41, and a lead 42 in electrical contact with the dropping mercury electrode, are also shown. The circuit is completed by lead 11 connected to the rheostat. As the technique of using the described apparatus is well understood, no description thereof will be undertaken.

In making the half cell, fritted glass parts with nominal maximum pore sizes of 40 microns and 5 microns were used at random. The glass body of the half cell was placed in a desiccator and was evacuated by means of a high vacuum pump for at least one hour; then with the glass body still under vacuum, triple distilled mercury was admitted through a funnel in the lid of the desiccator in such a fashion that mercury filled the space around the accessible portions of the fritted glass reservoir 20. With coarse frits the mercury penetrated the fritted glass walls to occupy the interior of reservoir 20 (as shown in Fig. 2) as soon as the pressure in the desiccator was restored to atmospheric pressure. With fine frits of 5 microns pore size, a pressure of 75 p. s. i. gage from a nitrogen cylinder was applied to the mercury to accomplish the same result; this latter operation was performed in a stainless steel bomb, to which the glass body of the half cell with the mercury had been transferred from the desiccator. After the mercury had been forced to occupy its intended chamber in the half cell, the excess mercury was shaken off. A paste consisting of mercurous chloride, special for calomel cells, and potassium chloride solution, special for calomel cells (both of which are procurable on the market) was mixed and was introduced into the interior of the half cell to fill it as shown in Fig. 2.

The potential of the described half cell was checked in saturated KCl solution against a saturated calomel electrode. The average deviation of all cells tested was 0.3 millivolt; these small deviations decreased even further after the cells came to equilibrium overnight.

Polarographic analyses of 1.00 millimolar and 2.00 millimolar cadmium sulfate in 0.1 normal KCl solution were conducted in a thermostated Lingane-Laitinen H-cell. The test compartment was separated from the reference electrode by an agar plug as usual. For comparison, a conventional mercury pool-calomel reference electrode in saturated KCl solution was placed in the bottom of the H-cell adjacent to the test compartment, the half cell of the invention being likewise immersed in the saturated KCl solution above the mercury pool electrode. The surface area of the mercury pool was 3.8 sq. cm. In view of the fact that the potential of the pool electrode may become inaccurate under certain conditions, this electrode was prepared with extreme care, and once it had been set up, it was neither removed nor mechanically disturbed. The pool electrode was renewed whenever significant changes in its potential (as measured against a calomel electrode) became apparent despite the precautions taken. Removal of the test solution and cleaning of its compartment in the H-cell were done with a suction tube. The test solution was freed from oxygen by purified nitrogen prior to the analysis, and nitrogen was passed over the solution during the analysis as is usual. The drop time of the capillary used was checked during each run at the half wave potential; it maintained a value of 4.89±0.01 sec. The $m^{2/3}t^{1/6}$ value was found to be 1.83 at an applied potential of −0.700 v. versus SCE, at which the magnitudes of the diffusion currents were determined. The capillary cell equipment was kept at 25°±0.1° C. by means of a thermostat control. The $iR$ drop across the polarographic circuit was measured. All data were corrected for the $iR$ drop and the residual current.

To detect possible time-dependent changes in potential of the described cell, five curves were drawn consecutively with readings based on the same test solution. Approximately 45 minutes elapsed between the first and the last measurements. The heights of the diffusion currents at an applied voltage of −600 mv. versus SCE (i. e., close to the half wave potential) agreed with each other to better than ±0.5 per cent. With the pool electrode and the described cell, both with 2 millimolar test solutions, the diffusion currents decreased gradually at a low rate. In both cases, the final apparent shift in half wave potential was calculated to be 0.3 mv. This change in potential was not due to a depletion in the test substance, since the cells, still analyzing the same test solution, recovered partially when they were left currentless for at least 15 minutes.

Fig. 8 shows the 1 millimolar and 2 millimolar cadmium sulfate curves obtained with the mercury pool electrode and the described half cell. The values measured for these curves often coincided. The diffusion currents measured at an applied potential of −700 mv. were within the ranges of 6.55±0.02 microamperes for the 1 millimolar solution and 13.05±0.05 microamperes for the 2 millimolar solution. The half wave potentials were read from the individual curves for each reference cell at ½ $i_d$ (where $i_d$ is the average diffusion current in microamperes during the life of the drop of mercury). The readings agreed among each other within 597±0.5 millivolts. The comparative resistances in ohms were as follows:

| Test Solution | Conventional Hg Pool | Described Half Cell |
|---|---|---|
| 1 millimolar | 1,310 | 1,560 |
| 2 millimolar | 1,160 | 1,480 |

The diffusion current constant was calculated on the basis of the original Ilkovic equation with $m^{2/3}t^{1/6}$ being 1.83. (The Ilkovic equation is explained in Collection of Czechoslovak Chem. Commun., Vol 6, p. 498; 1934.) The electrolysis was not diffusion controlled, since no maximum suppressor was present. The value found in this manner for $I_d$ was 3.58, which is in very good agreement with the data of Buckley and Taylor (Res. Natl. Bur. Stand. 34, 97; 1945) who obtained 3.54 for cadmium ions in the absence of a maximum suppressor. The half wave potential of 597±0.5 mv. agrees well with Lingane's value of 599±2 mv. (J. Am. Chem. Soc. 61, 2099; 1939). Attention is directed to the relatively low ohmic resistances of the cell circuit which includes the resistance of the agar plug; evidently the resistance of the new cell is of the same order of magnitude as that of the conventional mercury pool.

These data show that the new reference electrode, which was handled frequently during the course of the investigation, performed very satisfactorily in polarographic analysis. The cell is rugged, reliable and accurate and is very compact, besides being easily handled and packaged. By choosing a frit of the proper size, the area of the mercury pool can be made equal to or several times larger than that of the mercury pool in a conventional half cell. With the conventional mercury pool electrode, great care had to be exercised to arrive at equally precise results, but in routine polarographic analysis, precise results cannot be expected from the conventional electrode.

Although the portable calomel half cell of this invention has been described with particular reference to its use in polarographic analyses because of the great importance of having a reference electrode in such analyses which is very stable, it is to be understood that these portable calomel half cells may be used wherever calomel reference electrodes are needed.

This application is a companion to applications filed by me, Serial Nos. 373,928, filed August 12, 1953, and 419,941, filed March 30, 1954.

Having described my invention, what I claim is:

1. A calomel half cell comprising an elongated body made of material of low electrical conductivity; a tubular chamber fixed to and enclosed within the body and being open at both ends; the body below the tubular chamber being open to the interior of the tubular chamber and being adapted to hold calomel paste; the tubular chamber also being adapted to hold calomel paste; the body and tubular chamber together providing a compartment inside the body but surrounding said tubular chamber; the body having an opening in its side walls giving access to the interior of said compartment, so that KCl solution from a vessel surrounding said body may fill said compartment; the tubular chamber having a small opening in its side walls so that KCl solution in said compartment can contact the calomel paste at its interface; a fibrous plug adapted to hold the calomel paste in the tubular chamber; a substantially closed mercury reservoir within the body and made partly of glass and partly of fritted glass; said fritted glass contacting said calomel paste and mercury in said reservoir and in the pores of said fritted glass; a partition fixed transversely within the body below the lower end of the tubular chamber, the lower glass portion of said reservoir being fixed to said partition; a wire adapted to make electrical contact with mercury in the reservoir and extending through the partition; a lead wire having electrical contact with the first-mentioned wire; and means to secure the lead wire immovably to the lower end of the body.

2. A calomel half cell comprising an elongated body made of material of low electrical conductivity; a tubular chamber which is open at both ends enclosed within the body, the walls of said chamber merging with the walls of said elongated body so as to provide a compartment inside the body surrounding said chamber; the walls of said tubular chamber having a small opening, the walls of said body having an opening to admit KCl solution into said compartment; the body below the tubular chamber being open to the tubular chamber and being adapted to hold calomel paste; a fritted glass mercury reservoir adapted to contain mercury secured in the body below the lower end of the tubular chamber; a wire adapted to make electrical contact with the mercury in said reservoir; a lead wire having electrical contact with the first-mentioned wire; and means to secure the lead wire immovably to the lower end of the body.

3. The invention defined in claim 2, wherein the fritted glass reservoir is tubular with a closed upper end and with its lower end closed, a transverse partition being secured within the body and being integral with the lower end of the reservoir, said lower end being of the same material as the body and the partition.

4. The invention defined in claim 2, wherein the fritted glass mercury reservoir is surrounded by calomel paste and said calomel paste also fills the tubular chamber nearly to its open upper end; a fibrous plug being inserted in said open upper end to hold and protect the calomel paste; pure mercury completely filling the fritted glass mercury reservoir.

References Cited in the file of this patent

UNITED STATES PATENTS 2,190,835     Gruss et al.     Feb. 20, 1940

FOREIGN PATENTS 733,630     Germany     Mar. 31, 1943